United States Patent
Bedoukian

(10) Patent No.: US 10,434,482 B2
(45) Date of Patent: *Oct. 8, 2019

(54) VORTEX MIXING APPARATUS AND METHOD OF USE THEREOF

(71) Applicant: BEDOUKIAN RESEARCH, INC., Danbury, CT (US)

(72) Inventor: Matthew Aram Bedoukian, Redding, CT (US)

(73) Assignee: Bedoukian Research, Inc., Danbury, CT (US)

(*) Notice: Subject to any disclaimer, the term of this patent is extended or adjusted under 35 U.S.C. 154(b) by 98 days.

This patent is subject to a terminal disclaimer.

(21) Appl. No.: 15/698,834

(22) Filed: Sep. 8, 2017

(65) Prior Publication Data

US 2017/0368517 A1 Dec. 28, 2017

Related U.S. Application Data

(62) Division of application No. 14/500,141, filed on Sep. 29, 2014, now Pat. No. 9,789,455.

(Continued)

(51) Int. Cl.
*B01F 11/00* (2006.01)
*B01J 8/22* (2006.01)
(Continued)

(52) U.S. Cl.
CPC ...... *B01F 11/0031* (2013.01); *B01F 11/0077* (2013.01); *B01F 15/0277* (2013.01);
(Continued)

(58) Field of Classification Search
CPC .............. B01F 11/0031; B01F 11/0077; B01F 15/0277; B01F 15/065; B01F 2215/0431;
(Continued)

(56) References Cited

U.S. PATENT DOCUMENTS 3,735,960 A 5/1973 Bosch
7,669,517 B2 3/2010 Boussemart et al.
(Continued)

FOREIGN PATENT DOCUMENTS

WO 2004/054696 A1 7/2004

OTHER PUBLICATIONS

International Search Report dated Jan. 2, 2015 from corresponding PCT/US2014/058039, 3 pages.
(Continued)

*Primary Examiner* — Timothy C Cleveland
(74) *Attorney, Agent, or Firm* — Ohlandt, Greeley, Ruggiero & Perle, LLP

(57) ABSTRACT

An apparatus comprising: a vessel component comprising a flow-through interior chamber having an interior sidewall and an exterior sidewall; at least two inlets for introducing chemical components into the flow-through interior chamber; at least one outlet for removing product from the flow-through interior chamber; and an off center rotation component which is operatively connected to the vessel component. During operation of the apparatus, the off center rotation component generates vortical movement of at least two chemical components through the flow-through interior chamber of the vessel, and converts at least a portion of the at least two chemical components to at least one reaction product or product mixture. A method of using the apparatus to produce reaction products or product mixtures. The apparatus and method are useful for producing specialty chemicals such as fragrance and flavor compounds, insect pheromones, petrochemicals, pharmaceutical compounds, agrichemical compounds, and the like.

12 Claims, 2 Drawing Sheets

Related U.S. Application Data

(60) Provisional application No. 61/884,615, filed on Sep. 30, 2013.

(51) Int. Cl.
  *B01J 19/28* (2006.01)
  *B01F 15/02* (2006.01)
  *B01F 15/06* (2006.01)
  *B01F 5/00* (2006.01)
  *B01J 19/24* (2006.01)

(52) U.S. Cl.
  CPC ............. *B01F 15/065* (2013.01); *B01J 8/222* (2013.01); *B01J 19/285* (2013.01); *B01F 2005/0017* (2013.01); *B01F 2015/062* (2013.01); *B01F 2215/0431* (2013.01); *B01F 2215/0468* (2013.01); *B01J 19/2405* (2013.01); *B01J 19/28* (2013.01); *B01J 2208/00203* (2013.01); *B01J 2208/00212* (2013.01); *B01J 2219/0009* (2013.01); *B01J 2219/00094* (2013.01)

(58) Field of Classification Search
  CPC .......... B01F 2215/046; B01F 2015/062; B01F 2005/0017; B01J 8/222; B01J 19/2405; B01J 19/28; B01J 19/285; B01J 2208/00203; B01J 2208/00212; B01J 2219/0009; B01J 2219/00094
  See application file for complete search history.

(56) References Cited

U.S. PATENT DOCUMENTS

| | | |
|---|---|---|
| 8,246,295 B2 | 8/2012 | Morando |
| 8,771,524 B2 | 7/2014 | Vorage et al. |
| 8,920,862 B2 | 12/2014 | Sagalowica et al. |
| 9,789,455 B2 * | 10/2017 | Bedoukian ............... B01J 8/222 |
| 2004/0139908 A1 | 7/2004 | Bowe |

OTHER PUBLICATIONS

Written Opinion dated Jan. 2, 2015 from corresponding PCT/US2014/058039, 13 pages.

International Preliminary Report on Patentability dated Sep. 22, 2015 from corresponding International Application No. PCT/US14/58039, 3 pages.

* cited by examiner

VORTEX MIXING APPARATUS AND METHOD OF USE THEREOF

RELATED APPLICATION

This application is a divisional application of U.S. patent application Ser. No. 14/500,141, filed Sep. 29, 2014, which claims the benefit of U.S. Provisional Application Ser. No. 61/884,615, filed on Sep. 30, 2013, both of which are incorporated herein by reference.

BACKGROUND OF THE DISCLOSURE

1. Field of the Disclosure

This disclosure relates to a vortex mixing apparatus and a method of use thereof. In particular, this disclosure involves generating vortical movement of a fluid in a flow vessel by an external oscillatory surface.

2. Description of the Related Art

It is well-known that the reaction rate between two or more chemical constituents is enhanced by bringing the constituents into more intimate contact. Thus various types of mixing, stirring, agitating, and/or centrifuging methods have been used to produce faster and more complete reaction between two or more chemical constituents. However, such methods of mixing may not be sufficient in certain cases of instantaneous reactions in which side products are possible. The buildup of desired products can react again with starting materials and reduce yields. Various methods of flow chemistry, in which starting materials are simultaneously added continuously, have been employed to address this problem.

One example is to bring starting materials in contact through a T-tube type mixer with or without static mixing elements and baffles. The mixing in a tube relies on the flow rate of the material and exothermic reactions may not be cooled efficiently at higher flow rates. A sufficiently small tube in which mixing can occur via diffusion with good heat transfer solves this problem but limits throughput as well as limits any particulate matter from being introduced or formed during the reaction.

Another example involves the use of active mixing elements, which mix independently of flow rate. These systems have many benefits but require extensive engineering requirements and/or expensive seals. These systems also tend to have shearing elements of 100-500 uM size, which can limit the usefulness with solid feeds/formation.

Another important factor desirable for increasing throughput in a flow reactor system is often the surface area to volume ratio of heating/cooling. Exothermic reactions can potentially form undesirable side products at certain temperatures and to control this temperature increase, either flow rates need to be lowered or starting materials must be diluted.

The present disclosure provides many advantages over current technology, which shall become apparent as described below.

SUMMARY OF THE DISCLOSURE

The method of this disclosure provides exceptional mixing on a relatively small scale and desirable removal of product from the reaction medium. The undesired buildup of reaction product and/or partially reacted material in the reaction medium is minimized or prevented in accordance with the method of this disclosure.

In accordance with this disclosure, vortical movement of a fluid is generated in a flow vessel by an external oscillatory surface, e.g., an external dual action motor. The flow vessel remains essentially stationary during operation by use of a stabilizing element attached to the vessel. In particular, vortical movement of at least two chemical components is generated through a flow-through interior chamber of a vessel component by an external off center rotation component. The vortical movement creates a vortical layer of vessel contents on an interior sidewall of the flow-through interior chamber. At least a portion of the vortical layer can be removed through an outlet as reaction product or product mixture.

This disclosure relates in part to a method that comprises providing an apparatus in which the apparatus comprises: a vessel component comprising a flow-through interior chamber having an interior sidewall and an exterior sidewall; at least two inlets for introducing chemical components into the flow-through interior chamber; at least one outlet for removing product from the flow-through interior chamber; and an off center rotation component which is operatively connected to the vessel component. The method further comprises introducing through the at least two inlets, at least two chemical components into the flow-through interior chamber of the vessel component; generating vortical movement of the at least two chemical components through the flow-through interior chamber of the vessel component; wherein the vortical movement is generated by the off center rotation component; and converting at least a portion of the at least two chemical components to at least one reaction product or product mixture.

This disclosure also relates in part to an apparatus that comprises a vessel component comprising a flow-through interior chamber having an interior sidewall and an exterior sidewall; at least two inlets for introducing chemical components into the flow-through interior chamber; at least one outlet for removing product from the flow-through interior chamber; and an off center rotation component which is operatively connected to the vessel component. During operation of the apparatus, the off center rotation component generates vortical movement of at least two chemical components through the flow-through interior chamber of the vessel, and converts at least a portion of the at least two chemical components to at least one reaction product or product mixture.

Advantages of this disclosure include, for example, simplicity of the method and reactor apparatus, superior ability to handle solids without clogging, excellent heat transfer, and low cost of the method and reactor apparatus. Because the flow reactor remains essentially stationary during operation, expensive and failure prone seals are not required.

Further objects, features and advantages of the present disclosure will be understood by reference to the following drawings and detailed description.

DESCRIPTION OF THE EMBODIMENTS

Figure 1:
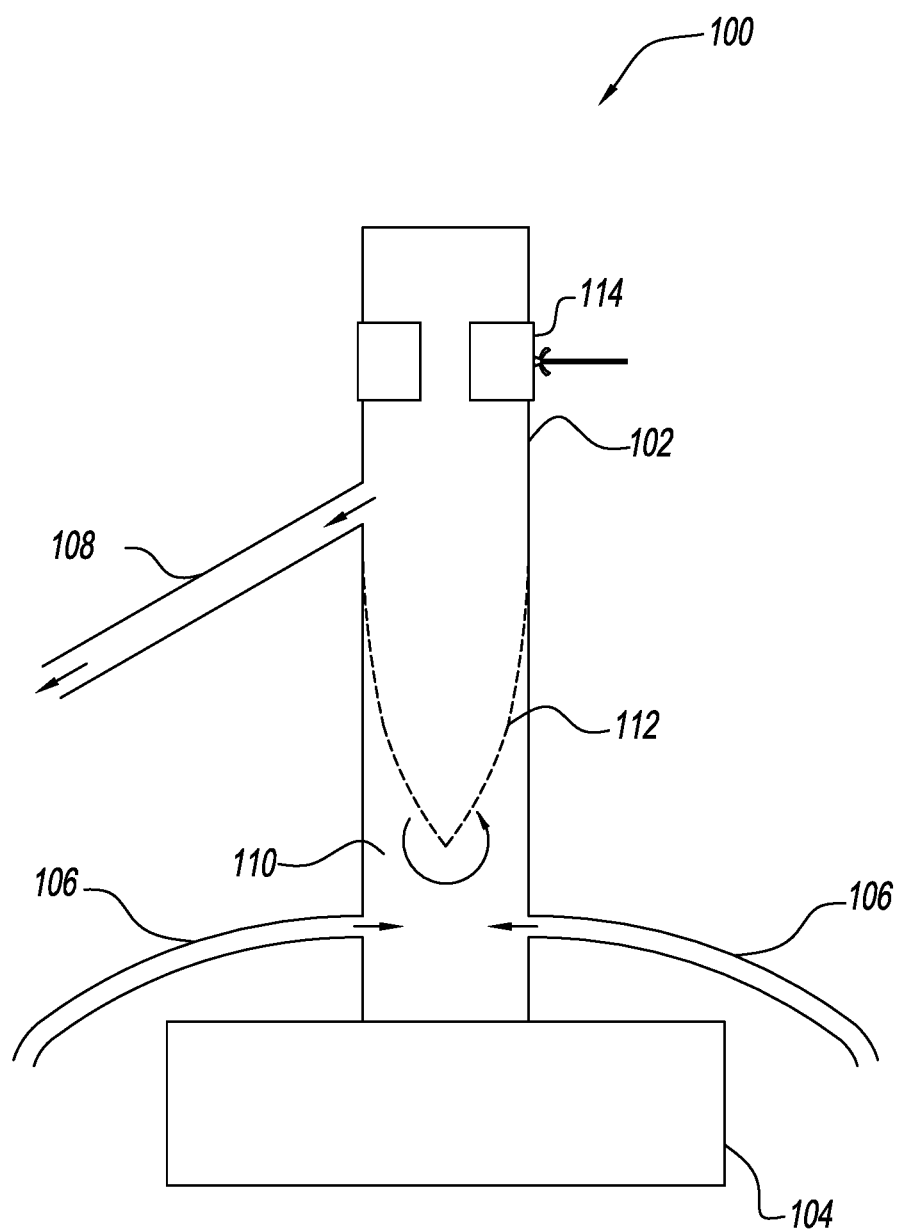
FIG. 1 is a perspective view of an illustrative vortex mixing apparatus in accordance with an embodiment of this disclosure.

Embodiments of the present disclosure now are described more fully hereinafter with reference to the accompanying drawings, in which some, but not all, embodiments of the disclosure are shown. Indeed, the disclosure can be embodied in many different forms and should not be construed as limited to the embodiments set forth herein. Rather, these embodiments are provided so that this disclosure may satisfy applicable legal requirements. Like numbers refer to like elements throughout.

The terms "comprises" or "comprising" are to be interpreted as specifying the presence of the stated features, integers, steps or components, but not precluding the presence of one or more other features, integers, steps or components or groups thereof.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when stated herein that something is "based on" something else, it may be based on one or more other things as well. In other words, unless expressly indicated otherwise, as used herein "based on" means "based at least in part on" or "based at least partially on".

As used herein, "vortical layer" refers to a volume of vessel contents (e.g., chemical components and/or reaction products and/or product mixtures) which has a circular or swirl flow pattern. In some cases, the vortical layer can be viewed as a rotating film of liquid such that any given particle within the liquid carrier follows a generally spiral path along the interior sidewall of the flow-through interior chamber of the vessel upwardly toward the outlet. Those skilled in the art will recognize that fluid flow patterns can include turbulent mixing and can vary significantly. Further, gradients in flow velocity can vary radially as well as along the length of the flow-through interior chamber of the vessel.

As used herein, the "vessel" or "vessel component" refers to a reactor or reactor component, or to a mixer or mixer component. When the vessel component is a reactor component, the chemical components are reactants, and the product is a reaction product. When the vessel component is a mixer component, the chemical components are non-reactive chemicals, and the product is a product mixture.

Where methods described herein indicate certain events (e.g., mixing of materials) occurring in certain orders, the ordering of certain events may be modified. Moreover, while a method may be described as operating in a sequential manner, it should be understood that many of the method's operations can occur concurrently or in a different order.

In accordance with the present disclosure, a method of synthesizing compounds can include providing at least two chemical components in a vortical layer. Vortical movement of the at least two chemical components is generated through a flow-through interior chamber of a vessel component. The vortical movement is generated by an off center rotation component. At least a portion of the at least two chemical components is converted to at least one reaction product or product mixture.

Figure 2:
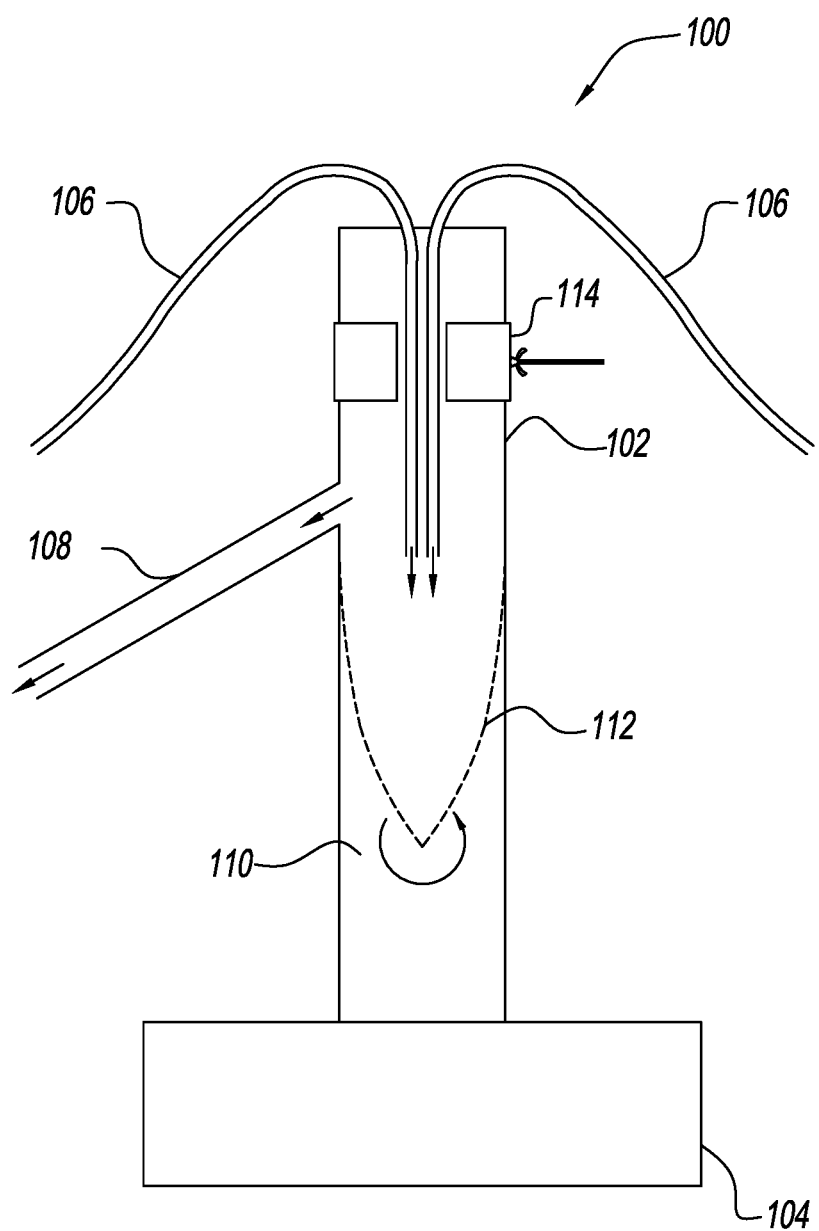
FIG. 2 is a perspective view of an illustrative vortex mixing apparatus in accordance with an embodiment of this disclosure.

Although a number of vessels can be used, the preferred configuration is a vortex mixing apparatus. FIGS. 1 and 2 show vortex mixing apparatuses which are described in more detail below. The off center rotation component has an off center rotational speed that can be adjusted to achieve a predetermined vortical layer thickness and height along the interior sidewall of the flow-through interior chamber. Vortical thickness can be thicker with faster flow rates.

As the vortical layer travels upwardly through the vertical flow-through interior chamber of the vessel, synthesized compounds and/or reaction products and/or product mixtures can be removed from the vessel. Typically, the vortex layer rotates in an annular or cylindrical film layer along the interior sidewall of the vessel. Therefore, in one aspect, the vortical layer can be removed from at least one outlet of the vessel. Depending on the particular components in the outlet stream, separations can include a gas-liquid separator or liquid-liquid separation process.

In another embodiment of the present disclosure, the vortical layer may have a thickness from about 0.1% to about 40%, preferably from about 0.1% to about 20%, of a diameter of the vessel, and more preferably about 0.1% to about 5%. Preferably, in most instances, a thinner film is desired. Thus, throughput per vessel volume may be increased because of improved contact and increased heat and mass transfer. Further, the vessel and method of the present disclosure may suppress side-reactions and increase selectivity. Preferably, the vortex goes to the bottom of the flow-through interior chamber and remains relatively constant. As used herein, the vortical thicknesses are measured at a location in the flow-through interior chamber where the vortical movement of vessel contents approaches, and just before the vortical movement of vessel contents exits, the outlet tube.

Typical synthesis reactions are exothermic, thus heat can be removed from the vortical layer via any number of cooling elements. For example, cooling coils or other cooling elements can be placed within the vortical layer, preferably with minimal flow disturbance. Optionally, an external jacket or cooling tubes can be placed in thermal contact with the reactor body.

The vortex mixing apparatus and method of the present disclosure can be used in a wide variety of chemical reactions. By way of example, the chemical reaction can be a catalytic reaction. As such, a solid catalyst material can be provided as part of the liquid carrier to form a solid-liquid catalyst slurry. Alternatively, the catalyst material can be provided as a liquid catalyst, or a catalyst which is soluble in the carrier, which is mixed with the liquid carrier. Such catalytic reactions are multi-phase reactions including a solid or liquid catalyst, liquid carrier, a gas reactant, and optionally, reaction products. In some embodiments, the catalytic reactions are reactions involving at least three-phases.

The reactants can depend on the specific synthesis reaction desired. Either gas or liquid compositions can be used which contain specific reactants. In some embodiments, the reactant composition can include hydrogen and carbon monoxide, oxygen alone, oxygen and gaseous reactant, hydrogen alone, or gaseous reactant alone.

A wide range of chemical synthesis processes can be carried out using the vortex mixing apparatus and method of the present disclosure. Several examples of classes of reactions which are suitable for use in the present disclosure include, but are not limited to, Wittig reactions, Grignard reactions, synthesis of higher alcohols, oxidation products, alkylation products, oligomerization products, hydrogenation products, and Fischer-Tropsch products. Illustrative products include, for example, specialty chemicals such as fragrance and flavor compounds, insect pheromones, pharmaceutical compounds, petrochemicals, agrichemical compounds, and the like.

Reference will now be made to FIGS. 1 and 2 in which the various embodiments of the present disclosure will be discussed. It is to be understood that the following description is only exemplary of the principles of the present disclosure, and should not be viewed as narrowing the appended claims.

The manufacturing economy of reaction products is highly dependent on the efficiency of reactors used during synthesis processes. In an embodiment of the present disclosure, a vortex mixing reactor for multi-phase (gas, liquids and/or solids containing) processes can provide a reaction environment which allows for improved selectivity, improved yield and high reliability.

Referring now to FIGS. 1 and 2, a vortex mixing apparatus 100 can be used to establish a controlled high force field by vortical flow in order to increase the inertia of fine chemical component particles suspended in the mixture and to produce a high density of chemical components with directed motion in order to improve collision efficiency. The vortex mixing apparatus 100 can include a vessel body which can be comprised of multiple sections, although a single unit could be manufactured. In the embodiment shown in FIG. 1, a flow-through interior chamber 102 can have inlets 106 operatively connected to the bottom portion thereof. In the embodiment shown in FIG. 2, the flow-through interior chamber 102 can have inlets 106 operatively connected to the top portion thereof. The vessel component comprising the flow-through interior chamber 102 is operatively connected with an off center rotation component 104. Vortical movement of the vessel contents 110 is generated by the off center rotation component 104.

In addition to inlets 106, one or more secondary inlets can be operatively connected to the flow-through interior chamber 102. The secondary inlets can be configured for use in introducing additional solid, gas, and/or liquid chemical components into the flow-through interior chamber 102 of the vortex mixing apparatus 100. The vortex mixing apparatus 100 of this disclosure is a flow-through vessel such that chemical components enter one portion of the flow-through interior chamber 102 and exit a separate portion of the flow-through interior chamber 102.

In the embodiment of FIGS. 1 and 2, the reactant product or product mixture outlet 108 is positioned on the exterior sidewall of the flow-through interior chamber 102 such that a rising portion of the vortical layer 112 is removed from the flow-through interior chamber 102 as reaction product or product mixture. The reaction product or product mixture discharged from the vortex mixing apparatus 100 can be directed to a separate unit for further reaction and/or separations. Thus, in some embodiments, a separator can be operatively connected to the reaction product or product mixture outlet 108. Non-limiting examples of such separators can include gas-liquid separators, liquid-liquid separators, or the like. Such separators are well-known to those skilled in the art and can be chosen based on the particular reaction products or product mixtures.

Although FIGS. 1 and 2 illustrate a vertical vessel, the actual orientation can be varied to almost any position. In some embodiments, the chemical components and vortical layer travel at a sufficiently high velocity to make the direction of gravity largely irrelevant. Therefore, in some embodiments, the vessel can be oriented in a horizontal or inversed position.

Referring again to FIG. 1, the vortex mixing apparatus 100 is shown wherein chemical components are fed through inlets that enter from a bottom portion into the flow-through interior chamber 102 to develop a vortical flow of a certain thickness in the radial direction. Referring again to FIG. 2, the chemical components can also be fed through inlets that enter from the top of the tube through a header portion or the side wall. The reactants can include liquid, gas and/or solid materials. For example, solid particles can be suspended in the liquid chemical components, e.g., an oil, to form a slurry.

In an embodiment, referring to FIGS. 1 and 2, the vortex mixing apparatus 100 includes an off center rotation component 104 which is operatively connected to the vessel component, i.e., flow-through interior chamber 102. The off center rotation component 104 has an off center rotational speed that is adjusted to achieve a predetermined vortical layer thickness and height along the interior sidewall of the flow-through interior chamber 102. The vortical flow of the vessel contents 110 forms a rotating vortical layer or film 112 of the vessel contents 110. Preferably, the vortical movement creates a vortical layer 112 of vessel contents 110 on the interior sidewall of the flow-through interior chamber 102. Off center rotation devices useful in this disclosure are well-known to those skilled in the art and can be chosen based on the particular off center rotational speed required for a particular reaction, reaction products, product mixtures, and the like.

In accordance with this disclosure, the vessel component, i.e., flow-through interior chamber 102, remains essentially stationary during operation, and is operatively connected to the off center rotation component 104. Preferably, a stabilizing element or elements such as a universal joint or clamp 114 is used above the vibratory surface of the off center rotation component 104 to hold the vessel component, i.e., flow-through interior chamber 102, in place.

Referring again to FIGS. 1 and 2, the reaction product or product mixture can be discharged through the discharge outlet 108. The product (e.g., liquid) exiting the discharge outlet 108 tube has at least some back pressure, and it is important to prevent any of the liquid building up in the exit tube or backfilling. Preferably, the tube is sufficiently wide and/or downward sloping to allow free flow of product being discharged from the tube. Alternatively, this can also be achieved with, for example, a pump.

The specific operating conditions can vary, depending on the desired reaction or mixing operation. However, the vortex mixing apparatus 100 can typically operate at reaction temperatures in the range of −80° C.-350° C. and pressure range of 1-100 atm. Further, the vortex mixing apparatus 100 can operate over a wide range of temperature and pressure. The materials and thickness of the vessel can be adjusted in order to accommodate high reaction temperatures and pressures. For example, the thickness of the flow-through interior chamber 102 can be increased or decreased to account for varying reactor or mixer conditions. The vessel body can be formed of any material which is non-reactive with the chemical component and product compositions and is capable of withstanding the operating conditions such as temperature, pressure, abrasiveness and the like. Non-limiting examples of suitable materials includes glass, polytetrafluoroethylene (Teflon), polyoxymethylene (Delrin), Hastelloy alloys, stainless steel, INCONEL (Ni—Cr—Fe alloys), ceramic, wood, plastics (e.g., polyether ether ketone (PEEK)), and composites or alloys thereof.

In another embodiment of the vortex mixing apparatus 100 of FIGS. 1 and 2, two or more chemical components (e.g., liquid) and an optional catalyst can be provided. Alternatively, solids can be fed with an appropriate feeding device for one or both of the chemical components. In one embodiment, the liquid chemical components can include homogenous solid catalyst particles (e.g., 1-10 μm) suspended or dissolved in the liquid chemical components. The catalyst particles can be provided in a variety of forms such as, but not limited to, powder, particulate, needles, coated surfaces, coated particles, or the like. In another embodiment, the catalyst can comprise a liquid. The liquid chemical components and catalyst can be fed through the header portion of the flow-through interior chamber 102 and, vortical movement is generated by the off center rotation component of the liquid chemical components and catalyst through the flow-through interior chamber of the vessel component. The vortical flow is of a certain thickness in the radial direction. Depending on the synthesis process and reaction kinetics, a plurality of vortex mixing apparatuses can be oriented in series and/or parallel to achieve a desired conversion, yield, and/or reaction sequence.

In the case of exothermic reactions (synthesis gas processes, alkylation, etc.), the process temperature can be determined either by controlling the inlet temperature of the reactants, vaporizing lower boiling liquid products into the gas phase, and/or inserting a cooling coil into the reaction space of the vortex mixing reactor. Generally, cooling elements can be placed in thermal contact with the reactants in the vortical flow and/or the reactor body. For example, cooling coils can be placed inside the reactor body within the vortical flow. Preferably, the cooling coils can be oriented to minimize vortical flow disturbance, e.g. parallel to flow direction. Alternatively, or in addition to internal cooling coils, a cooling jacket or cooling coils can be placed around the outside of the reactor body. In an arrangement of vortex mixing reactors working in series, the cooling units can be placed between the reactors or along feed lines to each reactor. For reactions that require heat, the elements used for cooling can also be used for heating. In accordance with this disclosure, some reactions can be heated to accelerate reaction time.

Exceptional dispersion of the chemical component compositions enhances, among other things, robust reaction conditions, and suppresses unwanted side reactions. Due to improved mass and heat transfer characteristics, and high throughput per unit reactor volume, use of this apparatus is expected to enable significant reductions in capital and operational costs of synthesis processes relative to multitubular reactors. The vortex mixing apparatus provides for the vessel contents to pass through the vessel in essentially a rotating thin film or vortical movement. Thus, the chemical components are primarily contacted throughout the vortical flow and limits exposure of reaction products to the reaction mixture. This assists in selective conversion of chemical components to the desired products and reduces undesirable side reactions by reducing contact times.

Special design considerations can be used to establish the conditions necessary for high efficiency reactions and mixing operations.

As described herein, in addition to representing a vertical reactor, FIGS. 1 and 2 also represent a vertical mixer. The mixture of materials discharged from the mixer can be used as a reaction feed for a downstream reaction. In this embodiment, no reaction occurs in the mixer. In another embodiment, two or more materials can be premixed before adding a third material. Also, in this embodiment, the three materials can be discharged as a mixture or a reaction can occur between the premixed materials and the third material added subsequently.

In some instances, it may not be safe to mix two materials together on a large scale because with the introduction of a trace catalyst/acid contaminant, an uncontrolled reaction may result. In accordance with the mixing embodiment of this disclosure, two materials can be mixed prior to entering a vessel with a catalyst. An additional advantage of the mixing embodiment is that the chemical component feed can be preheated and/or precooled efficiently.

In particular, the mixing apparatus of this disclosure can be used to add, either at ambient temperature, heated or cooled (with a jacket), two or more materials prior to feeding to a catalyst and/or another reagent(s), at which time the desired reaction can take place.

Some of the factors which can be used to describe the fluid flow phenomena within the present disclosure are vortical layer thickness, residence time, and velocity of vortical layer. Vortical-layer thickness is dependent on the rotational speed of the off center rotation component, chemical component flowrate and cylinder length, and can range from about 0.1% to about 40% as described herein, and often approximately 5% of the radius of the vortex mixing apparatus.

The vortex mixing apparatus can be sized to almost any capacity, depending on the intended application without affecting the basic function of the apparatus. However, most often the vortex mixing apparatus can have a vessel body having an inner diameter from about 4 cm to about 1 meter and preferably from about 5 cm to about 0.5 meter. The discussion herein focuses on a flow-through interior chamber; however, other configurations can also be used. For example, the vessel body can have a conical shape on at least the interior surface. In this example, the conical shape can narrow in diameter toward the outlet. In this way, flow velocities and local pressures can be controlled and maintained at predetermined levels without additional devices.

The vortex mixing apparatus of the present disclosure can be used in a wide variety of chemical synthesis processes. Suitable processes can include, but are not limited to, Wittig reactions, Grignard reactions, synthesis of higher alcohols, oxidation products, alkylation products, oligomerization products, hydrogenation products, Fischer-Tropsch products, and other processes with gas, liquids, and/or solids slurries. Illustrative products include, for example, specialty chemicals such as fragrance and flavor compounds, insect pheromones, pharmaceutical compounds, petrochemicals, agrichemical compounds, and the like. The chemical components can be any fluids capable of establishing the desired vortical flow, and in some cases, capable of suspending catalyst particles therein.

While we have shown and described several embodiments in accordance with our disclosure, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. A method comprising:
   providing an apparatus comprising:
   a vessel component comprising a flow-through interior chamber having an interior sidewall and an exterior sidewall;
   at least two inlets for introducing chemical components into the flow-through interior chamber; wherein the at least two inlets are operatively connected to a bottom portion or a top portion of the flow-through interior chamber; and
   at least one outlet for removing product from the flow-through interior chamber;
   introducing through the at least two inlets, at least two chemical components into the flow-through interior chamber of the vessel component;

generating vortical movement of the at least two chemical components through the flow-through interior chamber of the vessel component by an external oscillatory surface; and converting at least a portion of the at least two chemical components to at least one reaction product or product mixture.

2. The method of claim 1 wherein the external oscillatory surface is operatively and externally connected to the vessel component.

3. The method of claim 2 wherein the external oscillatory surface is operatively and externally connected to the bottom portion, a middle portion or a top portion of the vessel component.

4. The method of claim 1 wherein the vessel component is a reactor component, the chemical components are reactants, and the product is a reaction product; or the vessel component is a mixer component, the chemical components are non-reactive chemicals, and the product is a product mixture.

5. The method of claim 1 wherein the external oscillatory surface has an off center rotational speed that is adjusted to achieve a predetermined vortical layer thickness and height along the interior sidewall of the flow-through interior chamber.

6. The method of claim 1 wherein the vortical movement creates a vortical layer of vessel contents on the interior sidewall of the flow-through interior chamber, and at least a portion of the vortical layer is removed through the at least one outlet as reaction product or product mixture.

7. The method of claim 6 wherein the at least one outlet is positioned on the exterior sidewall of the flow-through interior chamber such that a rising portion of the vortical layer is removed from the flow-through interior chamber as reaction product or product mixture.

8. The method of claim 1 wherein the at least two chemical components have a flowrate which is adjusted to achieve a predetermined vortical layer thickness.

9. The method of claim 1 further comprising removing heat from, or introducing heat into, the vortical layer.

10. The method of claim 1 wherein the at least two chemical components comprise liquid, solid and/or gaseous materials.

11. The method of claim 1 further comprising recovering the at least one reaction product or product mixture.

12. The method of claim 1 wherein the at least one reaction product comprises a fragrance ingredient, a flavor compound, an insect pheromone, a pharmaceutical compound, petrochemical, or an agrichemical compound, and the at least one product mixture is used as a reaction feed for a downstream reaction.

* * * * *